United States Patent [19]
Hodges

[11] 3,774,009
[45] Nov. 20, 1973

[54] FASTENER FOR SECURING SHEET MATERIAL

[75] Inventor: Ralph R. Hodges, Belleville, Ill.

[73] Assignee: Empire Stove Company, Belleville, Ill.

[22] Filed: July 6, 1970

[21] Appl. No.: 60,996

Related U.S. Application Data

[62] Division of Ser. No. 821,668, May 5, 1969, abandoned.

[52] U.S. Cl. .................... 219/98, 219/93, 219/157
[51] Int. Cl. .................... B23k 9/20, B23k 11/14
[58] Field of Search .................. 219/98, 99, 157, 219/93

[56] References Cited
UNITED STATES PATENTS
3,312,315  4/1967  Graham .................... 219/98 X FOREIGN PATENTS OR APPLICATIONS
1,075,969  7/1967  Great Britain .................... 219/99

Primary Examiner—R. F. Staubly
Attorney—Gravely, Lieder and Woodruff

[57] ABSTRACT

A fastener having a head, a reduced boss on the head, and a small extension or nipple projecting from the boss is employed to secure two adjacent metal sheets together. One of the sheets has an aperture, and the boss is passed through this aperture until the small extension engages the other sheet. A capacitor is discharged through the fastener and the second sheet, causing the extension to weld to the second sheet.

4 Claims, 7 Drawing Figures

PATENTED NOV 20 1973
3,774,009
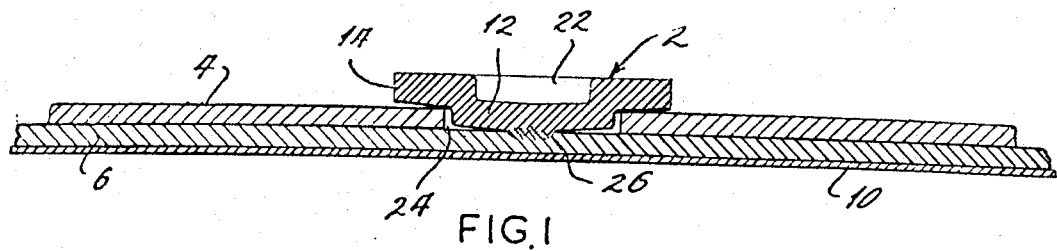
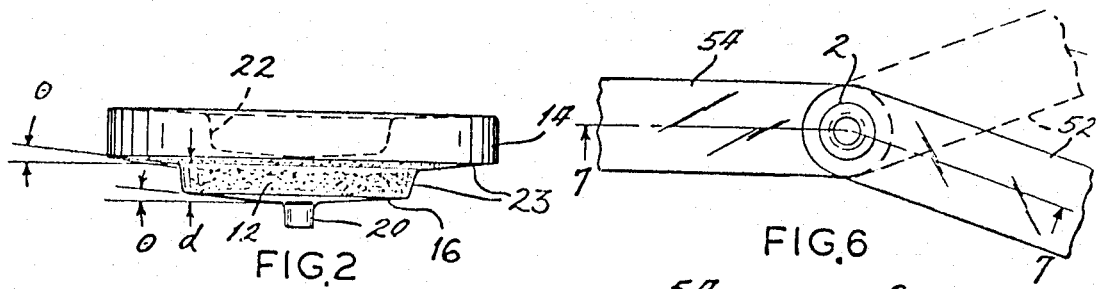
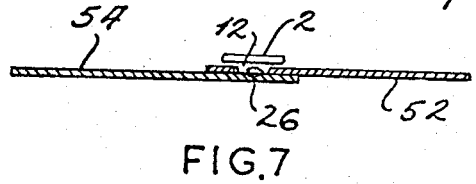
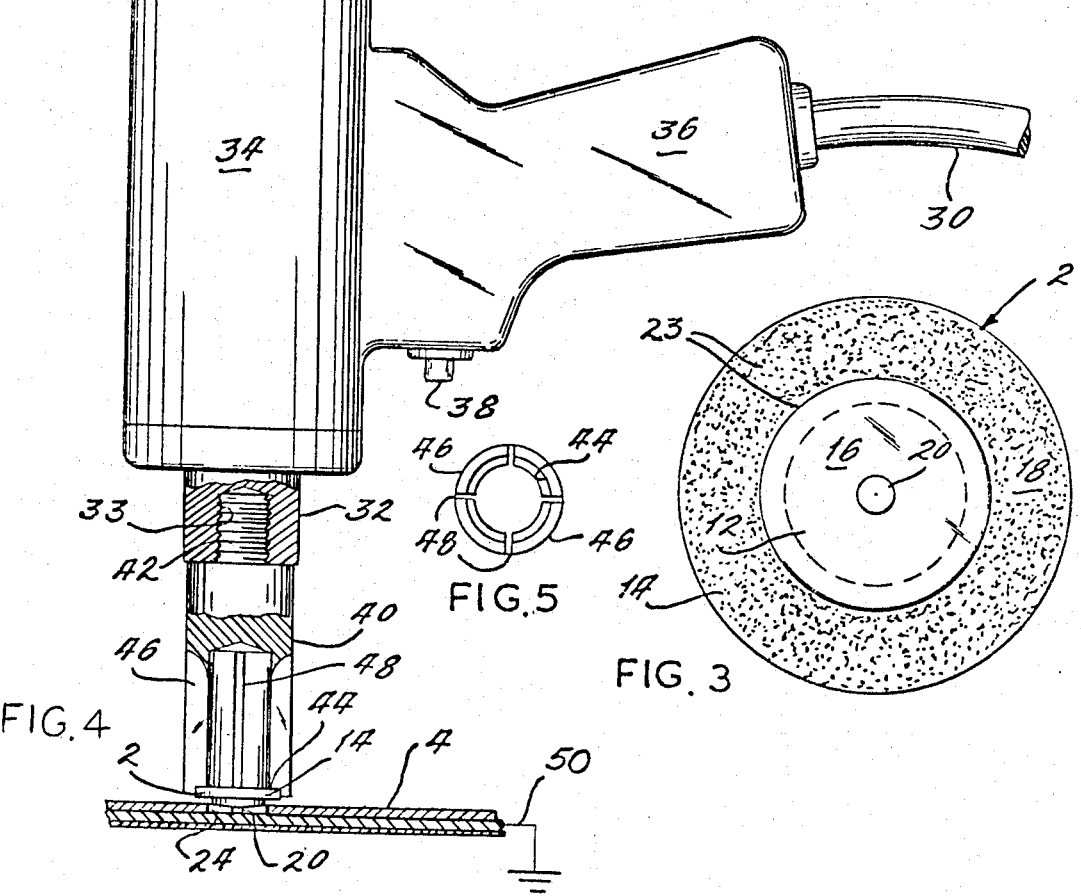

FASTENER FOR SECURING SHEET MATERIAL

This application is a division of application Ser. No. 821,688, filed May 5, 1969, now abandoned.

BACKGROUND OF THE INVENTION

This invention relates in general to a fastening device and a method of applying the same and more particularly to a fastener and method for securing metal sheet material together.

One of the most economical processes for attaching one sheet of metal to another is welding and particularly spot welding, but welding operations mar the surfaces of the metal sheets, and are therefore rarely used on metal sheets having decorative surfaces. For example, many household appliances are housed in cabinets fabricated from sheet metal having a thin vinyl or some other type of decorative veneer applied to one of its surfaces. The metal is supplied to the cabinet fabricator with the veneer applied to it, and the veneer itself is usually grained to simulate wood, Similarly, prepainted sheet metal is also marketed and used by metal fabricators. When veneered or prepainted sheet metal of this variety is subjected to spot welding operations, the veneer or paint is obliterated in the vicinity of the spot weld, and this, of course, detracts from the otherwise attractive appearance of the surface. Furthermore, in the case of prepainted sheets, the pain insulates the spot welding tips from the actual metal so that no weld occurs unless the paint is first removed at the location when the weld is desired. Consequently, some means other than spot welding must be employed to hold metal sheets of the foregoing types together. The same also applies to metal sheets having highly polished and other types of decorative surfaces.

SUMMARY OF THE INVENTION

One of the principal objects of the present invention is to provide a welding process for securing sheets of metal to one another without damaging decorative surfaces on those metals. Another object is to provide a process of the type stated which utilizes conventional welding equipment. A further object is to provide a fastener for use in a process of the type stated. An additional object is to provide a fastener of the type stated which is small and economical to manufacture. Yet another object is to provide a fastener for rotatively connecting a linkage to a support member. Still another object is to provide a process of the type stated which does not require highly trained personnel for its operation. These and other objects and advantages will become apparent hereinafter.

The present invention resides in method for securing an apertured sheet to a metal member and includes passing a surge of current through the metal member and through a fastener which abuts the metal member within the confines of the aperture. The current surge welds the fastener to the metal member and thereby secures the apertured sheet. The invention also resides in the fastener which includes a head, a reduced boss extending from the head, and a small extension projecting from the end of the boss.

The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur:

FIG. 1 is a sectional view of two sheets held together by a fastener constructed in accordance with and embodying the present invention;

FIG. 2 is an elevational view of the fastener;

FIG. 3 is a bottom view of the fastener;

FIG. 4 is a side elevational view, partially broken away and in section, showing the fastener as it is welded to one of the sheets with a stud welding gun;

FIG. 5 is an end view of the chuck used for holding the fastener to the welding gun;

FIG. 6 is a plan view of the fastener used to pivotally connect a linkage to a support member; and FIG. 7 is a sectional view taken along lines 7—7 of FIG. 6.

DETAILED DESCRIPTION

Referring now in detail to the drawings, 2 designates a fastener for securing sheets 4 and 6 of metal to one another such that opposed surfaces on each sheet are in tight facewise abutment (FIG. 1). The opposite face of the sheet 6 is provided with a decorative finish which may be a thin vinyl veneer 10 grained to simulate wood. Similarly the opposite face of the sheet 4 may also be provided with a decorative finish. Moreover, the abutting faces of the sheets 4 and 6 may be painted or otherwise provided with a finish.

The fastener 2 is formed from a metal which is compatible with the metal of the sheet 6 in the sense that the two may be welded to one another. The fastener 2 (FIGS. 2 and 3) is circular in shape and includes a circular shank or boss 12 and a head-forming peripheral flange 14 which is formed integral with and projects radially outwardly from the boss 12. Both the boss 12 and the flange 14 are provided with end surfaces 16 and 18, respectively, which face in the same direction and are furthermore tapered slightly so that the faces 16 and 18 are slightly crowned or convexed (FIG. 2). At its center the boss 12 is provided with an integrally formed extension or nipple 20 which projects axially from and is substantially smaller in cross-section than the boss 12. The depth $d$ (FIG. 2) of the boss 12 is approximately equal to the thickness of the sheet 4. The taper $\theta$ (FIG. 2) of the end surfaces 16 and 18 is approximately 2°. The fastener 2 when formed in a stamping operation is furthermore provided with a circular recess 22 which is surrounded by the flange 14 and opens outwardly in the opposite direction from which the boss 12 and extension 20 project. Finally, it is desirable to cover the tapered end face 18 on the flange 14 as well as the side face of the boss 12 with a continuous dielectric coating 23.

To attach the sheet 4 to the sheet 6, the former is provided at the selected point of attachment with a circular aperture 24 which is large enough to receive the boss 12, but on the other hand is smaller than the flange 14. Accordingly, the boss 12 will fit into the aperture 24, but will be prevented from passing completely through it by the flange 14. With the extension 20 pressed tightly against the portion of the sheet 6 exposed through the aperture 24 (FIG. 4), a surge of electrical current is passed through the fastener 2 and the sheet 6 and this current concentrates in the extension 20, melting it and thereby fusing the fastener 2 to the metal sheet 6 at a common weld 26 (FIG. 1).

The surge of electrical current is supplied by a conventional capacitor discharge stud welding apparatus (shown only in part in FIG. 4), and these devices, as the name implies, are designed primarily for welding various types of studs to metal surfaces using the discharge of capacitor banks to supply the heat generating welding current. Broadly speaking, the stud welding apparatus includes a bank of capacitors, one terminal of which is connected with a metal surface against which a selected stud is to be welded. The other terminal of the capacitor bank is connected through a switching device to a flexible lead 30 which terminates at a nose 32 forming part of a handheld welding gun 34. The nose 32 includes a threaded bore 33 which receives a chuck capable of holding a conventional stud. The chuck may be detached and replaced with another, different in shape and size, so that the gun 34 may be used for welding studs of various sizes and shapes. The gun 34 is provided with a hand grip 36 having a trigger 38 which when depressed actuates the switching device and thereby connects the nose 32 and of course the chuck on it electrically with the bank of capacitors. To weld such a stud held to a metal surface, the surface is grounded to the capacitor bank and the stud is held against the surface with the gun 34. When the trigger 38 is depressed the capacitors discharge, causing a high amperage impulse of current to flow through the stud and into the metal surface against which the stud is pressed. This current flow generates sufficient heat to weld the stud to the surface. Capacitor discharge stud welders of the type described are currently available from KSM Products, Inc., Morristown, New Jersey, and Tinnerman Products, Cleveland, Ohio, among other manufacturing concerns.

Insofar as the fastener 2 is concerned, it is held to the welding gun 34 by means of a special chuck 40 (FIGS. 4 and 5) having a threaded stud 42 at its one end and a circular recess 44 at its opposite end. The stud 42 threads into the bore 33 and secures the chuck 40 to the nose 32 of the gun 34. The recess 44 is surrounded by a plurality of circumferentially spaced arcuate jaws 46 (FIG. 5) which are separated by radial clearance slots 48. The diameter of the recess 44 is slightly smaller than the diameter of the flange 14 on the fastener 2 so that when the fastener 2 is inserted axially into the recess 44 with the extension 20 pointing outwardly, the jaws 46 will spread slightly to receive the flange 14 and will grip it thereafter to prevent the fastener 2 from falling from the gun 34. The depth of the recess 44 should not exceed the axial dimension of the flange 14 so that the tapered surface 18 will always be presented beyond the end faces of the jaws 46.

Prior to operating the welding gun 34 with the fastener 2 held in its chuck 40, the sheet 4 must of course be aligned with the sheet 6 in the exact position at which the two are to be permanently connected. Moreover, the sheet 6 must be connected to the opposite terminal of the capacitor bank and this is usually accomplished by clamping a ground conductor 50 against a raw, that is an uncoated, edge of the sheet 6. Thereafter through manipulation of the gun 34, the boss 12 on the fastener 2 is inserted into the aperture 24 (FIG. 4) and the extension 20 is pressed tightly against that portion of the rear surface of the sheet 6 which is exposed through the aperture 24. Should the rear surface of the sheet 6 be coated with a paint, that paint should be scraped away at the aperture 24 to insure good electrical contact between the extension 20 and the sheet 6. When the trigger 38 is depressed the capacitor discharges and sends a surge of high amperage current through the chuck 34 and the fastener 2. This current enters the grounded sheet 6 through the extension 20, and by reason of its relatively small cross-sectional size a high current concentration occurs within the extension 20. This melts the extension 20 and adjacent portions of the boss 12 and sheet 6 allowing the boss 12 to advance further into the aperture 24 under the pressure applied at the gun 34. The simultaneous melting of the extension 20 and the rear surface of the sheet 6 causes the fastener 2 to fuse to the sheet 6 with its flange 14 against the outwardly present surface of the sheet 4. With the fastener 2 welded to the sheet 6, the sheet 4 is effectively secured to the sheet 6 by the weld 26 and the enlarged flange 14. The tapered end face 16 on the boss 12 allows the current to remain concentrated at the extension 20 as the extension 20 melts, even when the gun 34 is tilted slightly from a truly perpendicular position with respect to the sheet 6. In other words, the taper 16, and for that matter the taper 18 also, enable a satisfactory weld 26 when the axis of the chuck 40 is not truly perpendicular to the plane of the sheet 6. The dielectric coating 23 prevents the weld 26 from occurring between the sheet 4 and the flange 14 or side of the boss 12 should the sheet 4 be grounded to the capacitor bank also. Such a grounding will occur when neither of the abutting faces on the sheets 4 and 6 are painted or otherwise covered with an electrical insulation. However, when the abutting faces of the sheets 4 and 6 are painted or otherwise insulated or even when one face is, the sheet 4 will be isolated from the sheet 6 and the coating 23 is not absolutely necessary. Nevertheless, it is desirable to supply all fasteners 2 with a coating 23 to avoid arc-over in the case of inadvertent grounding of the sheet 4.

Since the surge of current is of extremely short duration and further in view of the fact that it concentrates within the extension 20 and not within the sheet 6, the opposite or exposed face of the sheet 6 and the veneer 10 upon that face are not marred or in any way blemished. In other words, the weld does not extend deep enough into the sheet 6 to impair or damage the veneer 10.

When the boss 12 of the fastener 2 is affixed to the sheet 6 through the weld 26 so formed, the flange 14 extends over that portion of the sheet 4 which surrounds the aperture 24 and thereby prevents withdrawal of the sheet 4 from the sheet 6.

Thus, it is apparent that the fastener 2 may be used on metal sheets 6 which are used in cabinets and for other decorative purposes without detracting from the appearance of the finished product.

As will be seen by reference to FIGS. 6 and 7, when only one fastener 2 is employed a hinge joint is formed. In such a case the depth $d$ of the boss 12 should be slightly greater than the thickness of the hinged element so that the flange 14 does not bear firmly against that element and impede rotation. Thus, the fastener 2 is ideally suited for securing a linkage 52 to metal support member 54.

This invention is intended to cover all changes and modifications of the example of the invention herein chosen for purposes of the disclosures which do not constitute departures from the spirit and scope of the invention.

What is claimed is:

1. A fastener for attaching a sheet provided with an aperture to a metal member which is positioned adjacent to the sheet and exposed through the aperture, said fastener comprising: a head which is larger than the aperture and has its forward face slightly tapered such that the periphery of that forward face is set rearwardly from the remainder of that face; a boss formed integral with the head and projected forwardly from the front face thereof, the boss having a generally cylindrical side face which is smaller in diameter than the width of the aperture and merges into the forward face of the head with the included angle between said side face and said forward face being slightly greater than a right angle, the forward face of the boss also being tapered in the same direction as the forward face of the head and at about the same angle; and an extension formed integral with the boss and projected beyond the tapered forward face of the boss, the extension being centered with respect to and substantially narrower than the boss, whereby the boss may be projected into the aperture to bring the extension against the metal member and when electrical current is passed through the fastener, the extension thereof will weld to the metal member, securing the fastener and sheet to the metal member.

2. A fastener according to claim 1 wherein said face of the boss and the tapered forward face on the head are covered with a dielectric substance.

3. A fastener according to claim 1 wherein the head is provided with a centrally disposed recess which opens out of the rear face thereof.

4. A fastener for attaching a sheet provided with an aperture to a metal member which is positioned adjacent to the sheet and exposed through the aperture, said fastener comprising: a circular flange-like head which is larger than the aperture and has a back face, a front face, and a centrally disposed recess of circular configuration opening out of the back face; a boss formed integral with the head and projected forwardly from the front face of the head, the boss having a generally cylindrical side face which is smaller in diameter than the aperture and is coaxial with the circular head, the forward face of the boss being tapered slightly such that its peripheral edge is set further rearwardly than the remainder of the face and the included angle between the forward face and the side face is slightly greater than a right angle; an extension formed integral with the boss and projected beyond the tapered forward face of the boss, the extension being centered with respect to and being substantially narrower than the boss; and a dielectrical material covering the side face of the boss and the adjacent front face of the flange-like head; whereby the boss may be projected into the aperture to bring the extension against the metal member and when electrical current is passed through the fastener, the extension thereof will weld to the metal member, securing the fastener and apertured sheet to the metal member.

* * * * *